(12) United States Patent  (10) Patent No.: US 6,956,177 B2
Tanaka  (45) Date of Patent: Oct. 18, 2005

(54) SIGNAL TRANSMITTING DEVICE FOR STEERING COLUMN ASSEMBLY

(75) Inventor: Yoshiyuki Tanaka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1032 days.

(21) Appl. No.: 09/767,859

(22) Filed: Jan. 24, 2001

(65) Prior Publication Data

US 2001/0009219 A1   Jul. 26, 2001

(30) Foreign Application Priority Data

Jan. 24, 2000   (JP) .......................... P.2000-014682

(51) Int. Cl.[7] .......................... H01H 9/00; H01R 39/00
(52) U.S. Cl. ...................... 200/61.54; 439/15; 439/164
(58) Field of Search .................. 200/61.27–61.38, 200/61.54, 302.1, 302.3, 302.2; 439/11, 13, 439/15, 164

(56) References Cited

U.S. PATENT DOCUMENTS

| | | | | |
|---|---|---|---|---|
| 2,868,920 A | * | 1/1959 | Mumford et al. .... | 200/61.27 X |
| 4,310,174 A | * | 1/1982 | Sundeen et al. ..... | 200/302.1 X |
| 5,773,776 A | | 6/1998 | Uleski et al. | |
| 5,936,215 A | * | 8/1999 | Masuda et al. ............ | 200/61.3 |
| 6,022,230 A | * | 2/2000 | Matsumoto .......... | 200/61.27 X |
| 6,246,128 B1 | * | 6/2001 | Sugata ................ | 200/61.54 X |

FOREIGN PATENT DOCUMENTS

| | | | |
|---|---|---|---|
| EP | 0 965 492 A2 | 12/1999 | |
| JP | 10-241504 | 9/1998 | .......... H01H 25/04 |
| JP | 11-191346 | 7/1999 | .......... H01H 25/04 |

OTHER PUBLICATIONS

Patent Abstract of Japan, 11-191346, 07-13-99.

* cited by examiner

Primary Examiner—James R. Scott
(74) Attorney, Agent, or Firm—Sughrue Mion, PLLC

(57) ABSTRACT

An upper case (32) is rotatably provided in a body portion (31) to be fixed to an end face on the column side, and a spiral cable (29) capable of transmitting electrical signals is spirally accommodated in an annular space between the body portion (31) and the upper case (32). A cancel cam (40) for pressing a cancel portion (42) of a turn signal lever (36) with return rotation of a steering column assembly is protruded in a predetermined position on an outer peripheral surface of the upper case (32). A flange portion (41) is integrally formed on the cancel cam (40) over the outer peripheral surface of the upper case (32). A side wall (31B) to circulate and surround the flange portion (41) of the upper case (32) is erected on an upper surface of the body portion (31).

4 Claims, 5 Drawing Sheets

PRIOR ART

SIGNAL TRANSMITTING DEVICE FOR STEERING COLUMN ASSEMBLY

BACKGROUND OF THE INVENTION

1. Technical Field

The present invention relates to a signal transmitting device for steering column assembly which serves to connect auxiliary components on the steering wheel side (for example, an air bag device) to a wire harness on the vehicle body side.

2. Related Art

A combination switch to be attached to a steering column assembly of an automobile and a signal transmitting device for the steering column assembly which is fixed into the steering column assembly and is intended for supplying power or signals to an electronic apparatus such as an air bag have been provided separately from each other and have been assembled in the manufacturing line of automobile manufactures or part manufactures. In recent years, the steering wheel of an automobile has been provided with an air bag and various switches in addition to a horn, and space in the steering wheel has been limited due to the elements such as a switch apparatus, the combination switch and the signal transmitting device for a steering column assembly.

There has been proposed a signal transmitting device for a steering to supply power or signals to an auxiliary machinery on the rotating steering wheel side which has such a structure that canceller portion is added to a rotor part as is disclosed in JP-A-10-241504 shown in FIG. 4, for example. As shown in FIG. 4, a signal transmitting device 1 for a steering column assembly is accommodated in an annular concave portion 3 formed in a column 2. Both side surfaces of the column 2 are provided with a pair of connector accommodating portions 4 and 5. Attached to the connector accommodating portions 4 and 5 are connector portions 6A and 7A, which are formed on base ends of a turn signal lever 6 and a wiper control switch lever 7 and act as lever units.

The signal transmitting device 1 for the steering column assembly has an outer cylinder (under cover) 8 and an inner cylinder 9 to be rotated on the inside of the outer cylinder 8. A cable, which is not shown, is spirally accommodated between the outer cylinder 8 and the inner cylinder 9. A leading portion 11 for leading one end 10A of a cable to the outside is formed on the outer cylinder 8. The inner cylinder 9 is fixed to an outer periphery of a steering shaft and is rotated together with the steering shaft. A base plate portion 13 is formed integrally to be protruded from an upper surface of an upper lid 12 that is formed integrally with the inner cylinder 9.

An upper surface of the base plate portion 13 acts as an abutting face 13A where a steering wheel is to be fixed. A part of a circumferential portion is removed so that a press face (canceller portion) 14 oriented perpendicularly to the upper surface in a radial direction of the inner cylinder 9 is formed in the base plate portion 13. The canceller portion 14 is rotated integrally with the inner cylinder 9 through return rotation of the steering wheel, thereby abutting on a return portion (cancel cam) 15 of a turn signal cancel mechanism. Consequently, the turn signal lever 6 is returned to a neutral position.

For example, other signal transmitting devices for a steering column assembly are shown in FIG. 5 and have been disclosed in JP-A-11-191346. In a signal transmitting device 21 for a steering column assembly shown in FIG. 5, an inner cylinder 23 is rotatably attached to an outer cylinder 22 and a cable which is not shown is accommodated spirally in an annular space formed therein. A cancel cam 24 is protruded integrally from an outer peripheral surface of the inner cylinder 23. The outer cylinder 22 is screwed to the column side by inserting a screw through a hole 25A formed in a fixing portion 25. A lever unit such as a turn signal lever is attached to the signal transmitting device 21 for a steering column assembly in a direction of an arrow A, for example. The cancel cam 24 is rotated together with the steering wheel (not shown) of the steering column assembly in a direction of an arrow B (or a reverse direction to the B direction) in the figure with respect to a return portion cancel portion) provided in a lever unit. Consequently, the return portion is repelled with the cancel cam 24 to return the lever unit to neutral position.

In the respective signal transmitting devices for steering column assemblies, there is a possibility that dust might enter the periphery of the canceller portion or the cancel cam. Consequently, residue may disadvantageously be accumulated in a passage of the canceller portion or the cancel cam, thereby resulting in disrupting the cancel function.

Moreover, in the signal transmitting device for a steering column assembly having the structure shown in FIG. 5, when a state in which a user intentionally locks a lever (turn signal lever) (a load to be applied to the canceller portion 14 or the cancel cam 24 is lever locked) is generated, there is a possibility that strain and deformation might be caused on the inner cylinders 9 and 23, resulting in breakage of these units.

SUMMARY OF THE INVENTION

Therefore, it is an object of the invention to provide a signal transmitting device for a steering column assembly that can prevent degradation and breakage of a unit to which a signal transmitting device for a steering column assembly is attached and can prevent residue from entering a cancel function portion, which might otherwise result in deactivation of the cancel function.

A first aspect of the invention: is directed to a signal transmitting device for a steering column assembly including: a body portion;

an upper case rotatably provided in the body portion;

a cable spirally accommodated in an annular housing formed between the body portion and the upper case, one end of the cable being led from the body portion, the other end of the cable being led from the upper case;

a side wall having a predetermined height formed on the body portion to surround the upper case;

a window portion, for receiving a cancel portion of a cancel mechanism, formed at a part of the side wall;

a cancel cam, for pressing the cancel portion with return rotation of the steering column assembly, provided at outer periphery of the upper case; and a flange portion formed integrally with an outer peripheral surface of the upper case and an upper portion of the cancel cam.

According to the invention having such a structure, the side wall erected on the body portion and the flange portion formed on the peripheral surface of the upper case function as dust prevention walls and can prevent refuse from entering a passage of the cancel cam. Thus, it is possible to prevent the refuse from entering and thereby interfering with the operation of the cancel cam. Consequently, it is possible to enhance reliability of the signal transmitting device for a steering column assembly.

In the invention, moreover, a mechanical strength of the upper case can be increased by the flange portion. For example, even in the case in which a user intentionally locks the turn signal lever to apply an excessive load to the cancel cam, it is possible to prevent strain from being generated on the upper case which would cause deformation of the upper case, and furthermore, to prevent the upper case from being broken.

In the signal transmitting device for steering, the height of the side wall is set to be equal to or greater than that of the position where the flange portion is formed at the upper case.

According to the invention, therefore, it is possible to more enhance the function of preventing refuse from entering the steering column assembly according to the first aspect of the invention.

DETAILED DESCRIPTION OF THE PREFERRED EMBODIMENTS

Figure 1:
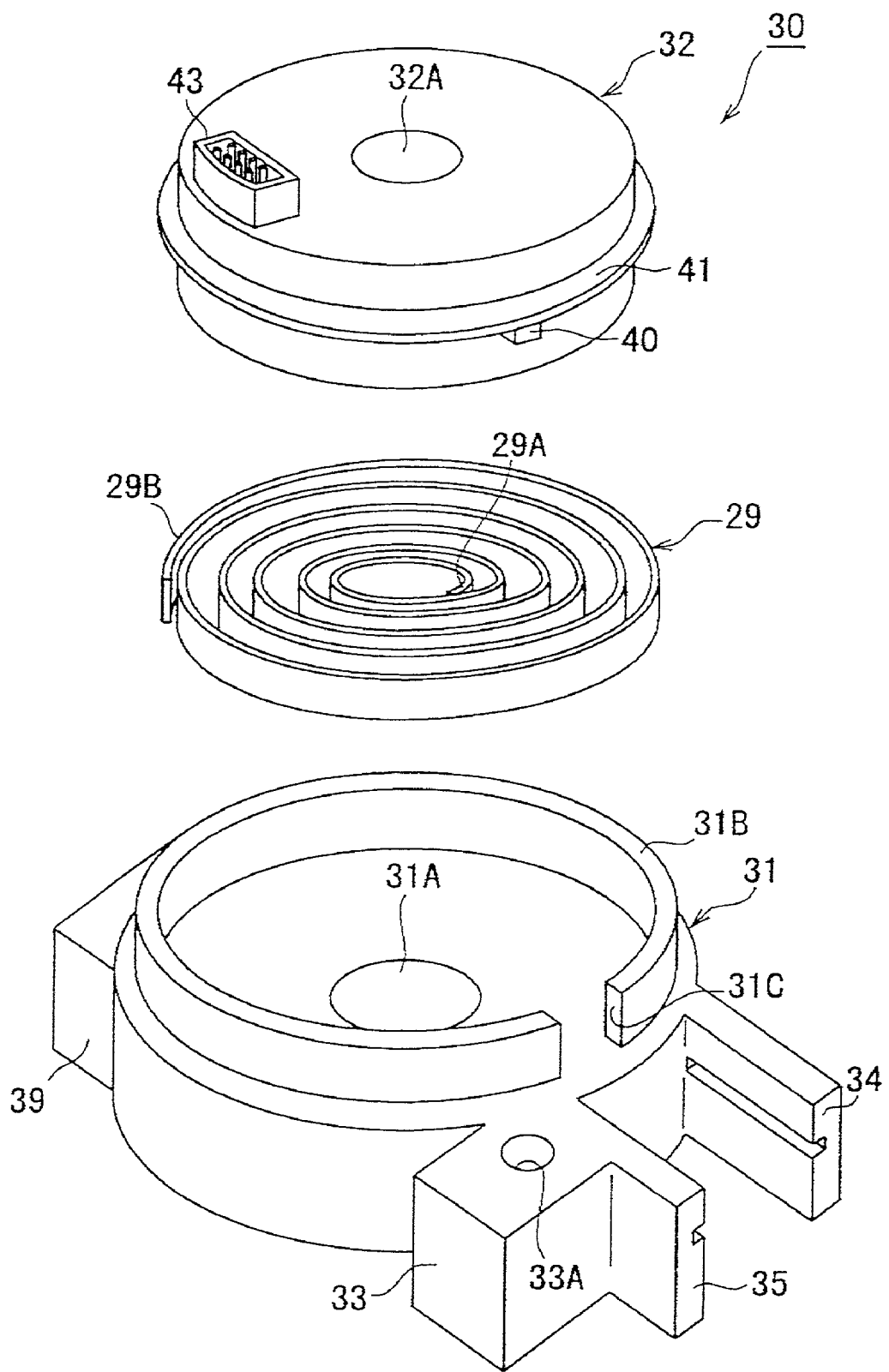
FIG. 1 is an exploded perspective view showing a signal transmitting device for a steering column assembly according to an embodiment of the invention.

The details of a signal transmitting device for a steering column assembly according to the invention will be described based on an embodiment with reference to the drawings. FIG. 1 is an exploded perspective view showing a signal transmitting device for a steering column assembly according to the embodiment, FIG. 2 is a front view showing the signal transmitting device for a steering column assembly according to the embodiment, and FIG. 3 is a partially sectional side view showing the signal transmitting device for a steering column assembly.

As shown in FIG. 1, a signal transmitting device 30 for a steering column assembly according to the embodiment comprises: a body portion 31 to be fixed to the column side; an upper case 32 rotatably provided in the body portion 31; and a spiral cable 29 to be spirally accommodated in an annular internal space formed by the body portion 31 and the upper case 32.

The body portion 31 has a through hole 31A provided on a center thereof, through which a steering shaft (not shown) is to be inserted. Moreover, the body portion 31 has a fixing portion 33 formed integrally to be protruded toward the outside. A bolt inserting hole 33A is formed on the fixing portion 33. A bolt is inserted through the bolt inserting hole 33A and is fixed with a screw to the column side (not shown). Furthermore, a pair of fixing bracket portions 34 and 35 are protruded from an outer side surface of the body portion 31. As shown in FIG. 2, a connecting portion 37 of a turn signal lever 36 is attached between the fixing bracket portions 34 and 35.

Figure 2:
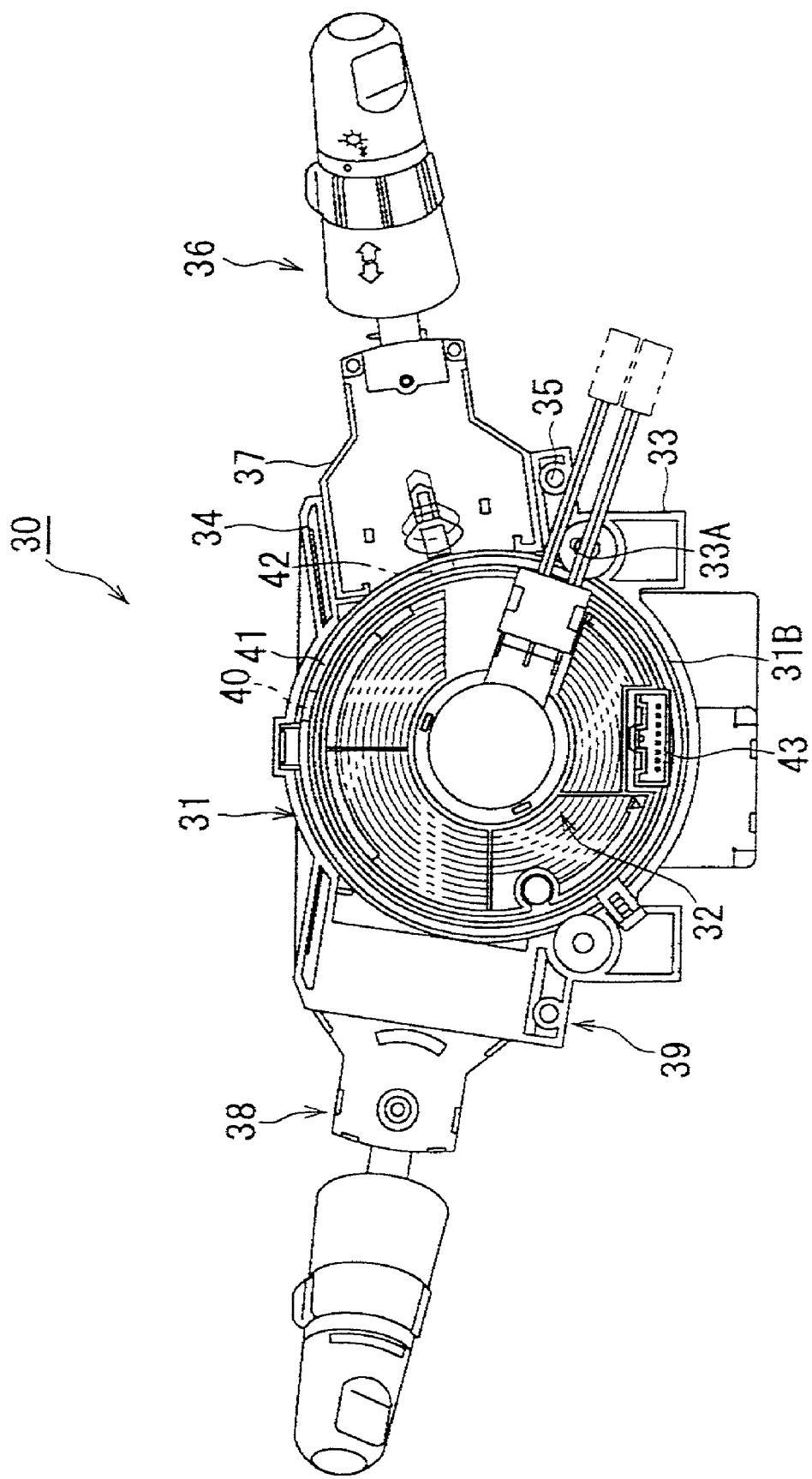
FIG. 2 is a front view showing the signal transmitting device for a steering column assembly according to the embodiment.
Figure 3:
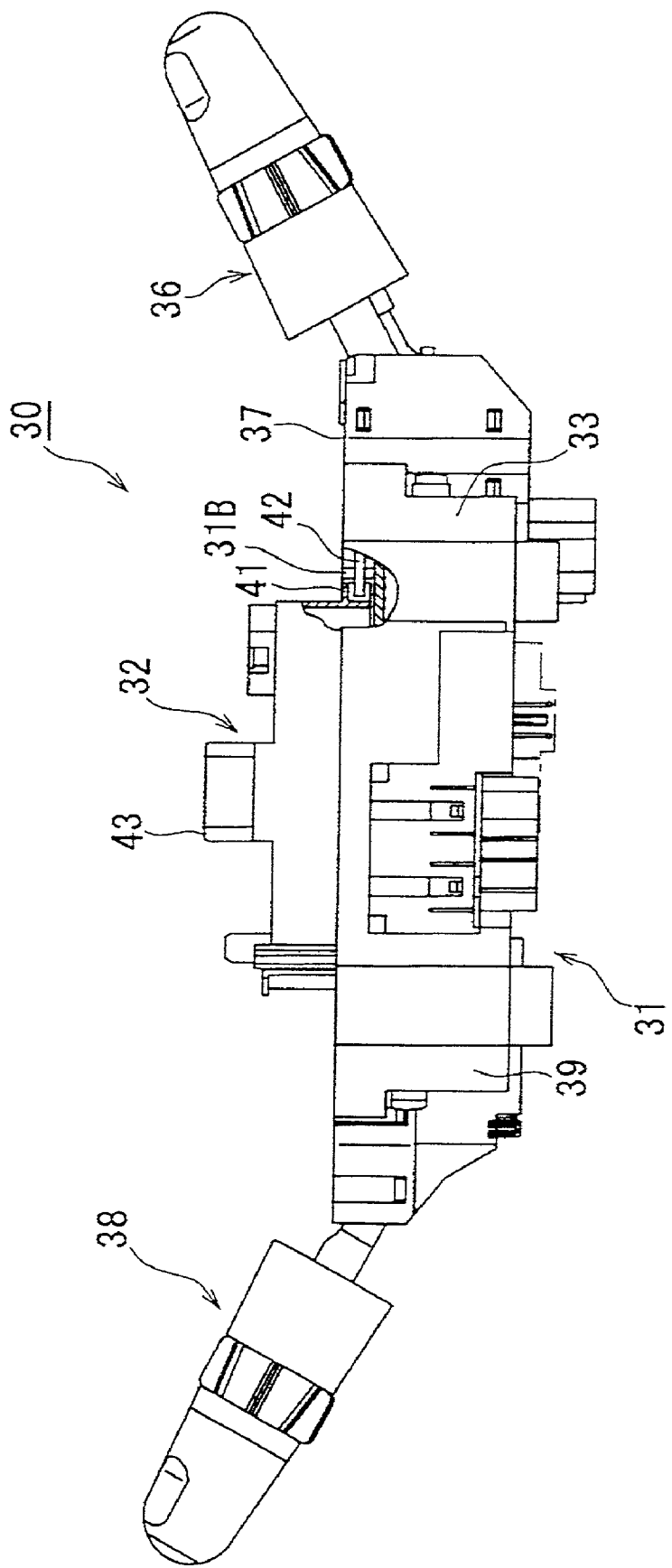
FIG. 3 is a partially sectional side view showing the signal transmitting device for a steering column assembly according to the embodiment.
Figure 4:
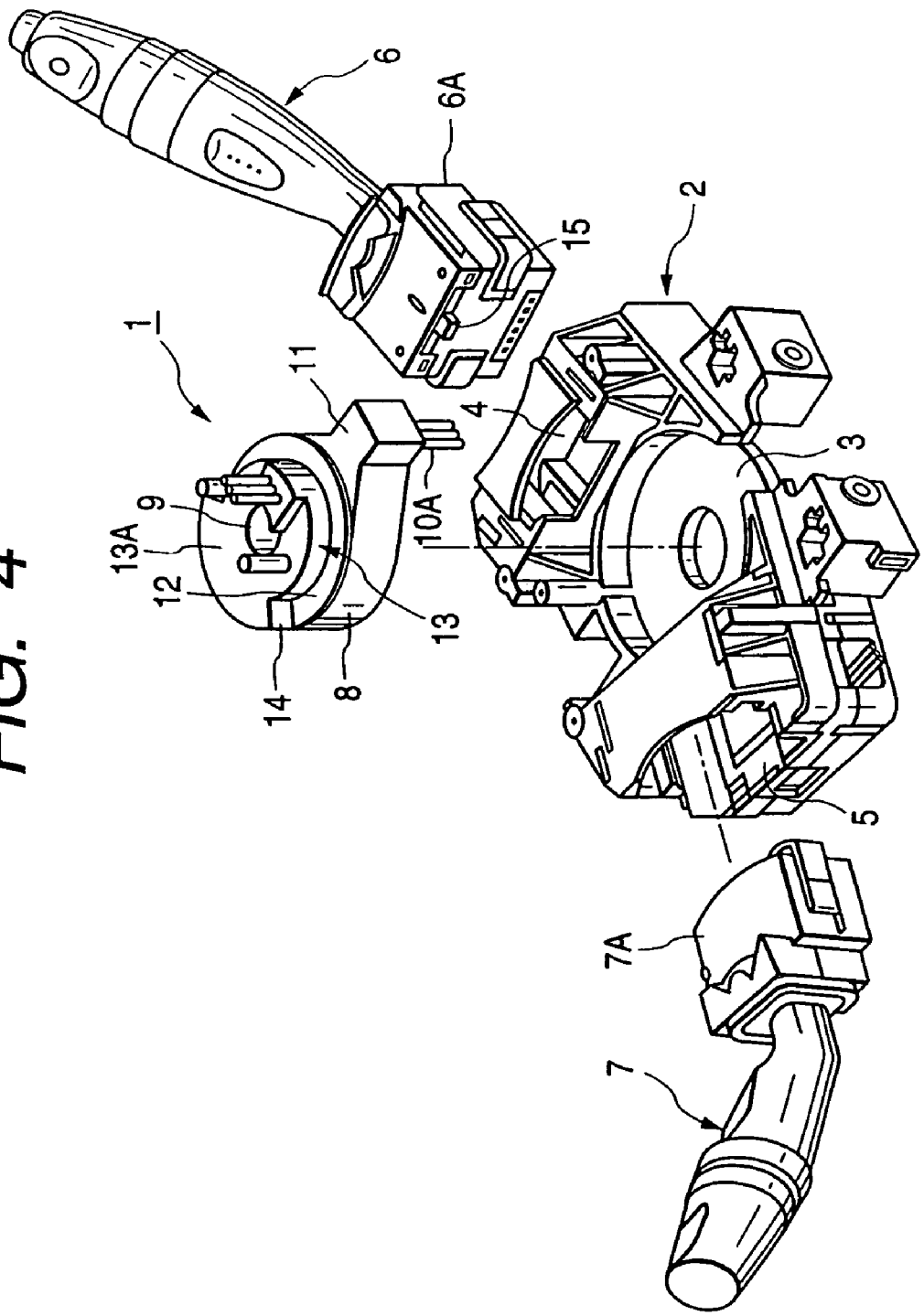
FIG. 4 is an exploded perspective view showing a related signal transmitting device for a steering column assembly.
Figure 5:
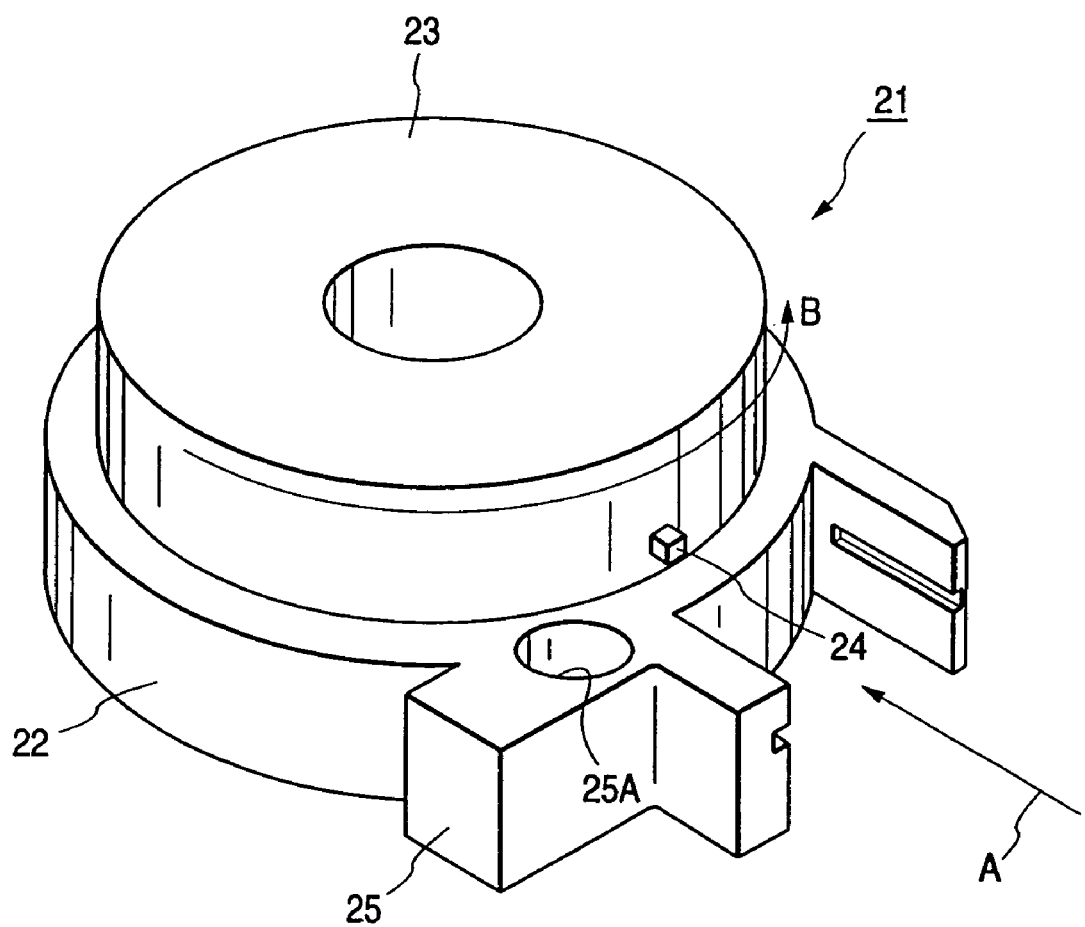
FIG. 5 is a perspective view showing the related signal transmitting device for a steering column assembly.

A fixing bracket portion 39, to which a wiper lever unit 38 is to be attached, is provided in an substantially opposite position to the fixing bracket portions 34 and 35 over the outer side surface of the body portion 31 as shown in FIGS. 2 and 3.

A side wall 31B having a predetermined height is integrally formed as an annulus ring rising wall on an upper surface of the body portion 31 to surround a peripheral surface of the upper case 32 to be assembled. As shown in FIG. 1, a window portion 31C having a portion of the side wall 31B removed is formed on the side wall 31B in a position where the turn signal lever 36 is to be attached. A cancel portion 42 of the turn signal lever 36, which will be described below, can be protruded from the same portion toward the inside of the side wall 31B.

The upper case 32 has a through hole 32A provided on a center thereof, through which the steering shaft is caused to penetrate. A projection-shaped cancel cam 40 and a flange portion 41 for circulating over an outer peripheral surface thereof are protruded integrally from an outer peripheral surface of the upper case 32. The flange portion 41 is perpendicularly protruded from the outer peripheral of the upper case 32.

As shown in FIGS. 2 and 3, an end face of the connecting portion 37 of the turn signal lever 36 is provided with the cancel portion 42 for being engaged in order to return the turn signal lever 36 into a neutral position. The cancel portion 42 is urged in such a direction as to be protruded toward the outside of the end face through a spring member (not shown).

One end 29A of the spiral cable 29 for signal transmission which is accommodated in the signal transmitting device 30 for a steering column assembly is led from the body portion 31. The end 29A is connected to the turn signal lever 36 and the wiper lever unit 38. The other end 29B of the spiral cable 29 is connected to a connector 43 protruding from an upper surface of the upper case 32. The connector 43 is connected to an air bag or various switches on the steering wheel side, for example.

In a state in which the upper case 32 is provided in the body portion 31, the side wall 31B surrounds the cancel cam 40 and the flange portion 41 to be accommodated therein as shown in FIG. 3. A height of the side wall 31B is set to be equal to or greater than that of the position where the flange portion 41 is formed at the upper case 32. Therefore, the flange portion 41 and the side wall 31B function as dust entering prevention walls and can prevent dust from entering a passage of the cancel cam 40. In particular, the dust can be prevented from entering when the signal transmitting device 30 for a steering column assembly is to be assembled or after vehicle loading. Therefore, the operation of the cancel cam 40 can be prevented from being disturbed by the refuse so that reliability of the signal transmitting device 30 for a steering column assembly can be enhanced.

If the height of the side wall 31B is smaller than that of the position where the flange portion 41 is formed at the upper case 32, dust enters easily.

In the signal transmitting device 30 for a steering according to the embodiment, the flange portion 41 is formed integrally with the cancel cam 40 over the peripheral surface of the upper case 32. Consequently, a mechanical strength of the cancel cam 40 can be increased. Therefore, even if a user intentionally locks the turn signal lever 36 (a load to be applied to the cancel cam 40 is lever locked), for example, it is possible to prevent the strain and deformation of the upper case 32 from being generated.

While the embodiment has been described, the invention is not restricted thereto but various changes can be made without departing from the gist of the structure according to the invention.

For example, although the upper case 32 is rotatably attached to the body portion 31 in the embodiment, the body portion 31 maybe formed in apart of a column, that is, a concave portion to function as the body portion may be formed on the column side and the upper case 32 may be rotatably accommodated in the concave portion. In this case, the number of parts can be reduced.

According to the present invention, the side wall erected on the body portion and the flange portion formed on the peripheral surface of the upper case function as the dust entering prevention walls and can prevent refuse from entering the passage of the cancel cam. Thus, it is possible to prevent the refuse from entering and disturbing the operation of the cancel cam when the signal transmitting device for a steering is to be assembled or after vehicle loading. Consequently, it is possible to obtain an effect that the reliability of the signal transmitting device for a steering column assembly can be enhanced.

According to the present invention, it is possible to enhance the effect of preventing refuse from entering which is the advantage of the first aspect of the invention. Thus, durability of the signal transmitting device for a steering can be enhanced.

What is claimed is:

1. A signal transmitting device for a steering column assembly comprising:
   a body portion;
   an upper case rotatably provided in said body portion;
   a cable spirally accommodated in an annular housing formed between said body portion and said upper case, one end of said cable being led from said body portion, the other end of said cable being led from said upper case;
   a side wall having a predetermined height formed on said body portion to surround said upper case;
   a window portion, for receiving a cancel portion of a cancel mechanism, formed at a part of said side wall;
   a cancel cam, for pressing the cancel portion with return rotation of the upper case with respect to the steering column assembly, provided at an outer periphery of said upper case; and
   a flange portion formed integrally with an outer peripheral surface of said upper case and an upper portion of said cancel cam.

2. A signal transmitting device for a steering column assembly according to claim 1, wherein said predetermined height is set to be equal to or greater than that of the position where said flange portion is formed at said upper case.

3. A signal transmitting device for a steering column assembly according to claim 1, wherein said flange portion is protruded from said upper case.

4. A signal transmitting device for a steering column assembly according to claim 1, wherein said side wall surrounds said cancel cam and said flange portion.

* * * * *